United States Patent
Lee et al.

(10) Patent No.: US 11,204,236 B2
(45) Date of Patent: Dec. 21, 2021

(54) DENTAL DIGITAL MEASUREMENT APPARATUS AND DIGITAL MEASUREMENT METHOD USING THE SAME

(71) Applicants: B&L BIOTECH, INC., Ansan-si (KR); In Whan Lee, Ansan-si (KR)

(72) Inventors: In Whan Lee, Ansan-si (KR); Gi Soo Choi, Incheon (KR)

(73) Assignees: B&L BIOTECH, INC., Ansan-si (KR); In Whan Lee, Ansan-si (KR)

( * ) Notice: Subject to any disclaimer, the term of this patent is extended or adjusted under 35 U.S.C. 154(b) by 39 days.

(21) Appl. No.: 16/801,713

(22) Filed: Feb. 26, 2020

(65) Prior Publication Data

US 2021/0172723 A1    Jun. 10, 2021

(30) Foreign Application Priority Data

Dec. 10, 2019    (KR) .................. 10-2019-0164002

(51) Int. Cl.
  *G01B 11/02*    (2006.01)
  *G06T 7/80*    (2017.01)
  *G06T 7/50*    (2017.01)
  *G06K 9/20*    (2006.01)

(52) U.S. Cl.
  CPC ............ *G01B 11/02* (2013.01); *G06K 9/2027* (2013.01); *G06T 7/50* (2017.01); *G06T 7/80* (2017.01); *G06T 2200/24* (2013.01)

(58) Field of Classification Search
  CPC .. G01B 11/02; G06T 7/80; G06T 7/50; G06T 2200/24; G06K 9/2027

USPC ......................................................... 382/106
See application file for complete search history.

(56) References Cited

U.S. PATENT DOCUMENTS

| 3,358,826 | A | 12/1967 | Siegel |
| 2010/0224396 | A1 | 9/2010 | Nomiya |
| 2015/0371854 | A1 | 12/2015 | Davis |
| 2016/0126174 | A1 | 5/2016 | Shen et al. |

(Continued)

FOREIGN PATENT DOCUMENTS

| CN | 101874429 B | 4/2013 |
| DE | 102007052496 A1 | 5/2009 |
| EP | 2829254 A1 | 1/2015 |

(Continued)

OTHER PUBLICATIONS

Communication dated Sep. 21, 2020, from the European Patent Office in application No. 20158657.5.

(Continued)

*Primary Examiner* — Michael R Neff
(74) *Attorney, Agent, or Firm* — Sughrue Mion, PLLC

(57) ABSTRACT

Disclosed is a digital measurement apparatus including a holding unit on which a measurement object to be measured is placed; and a measurement unit for measuring the measurement object by comparing an image of the measurement object placed on the holding unit with a preset reference value, and providing a reference for adjusting the length of a new measurement object based on a measured value of the measurement object. With this configuration, regardless of photographing conditions, by performing calibration using a set reference value, the accuracy of a measured value may be improved.

12 Claims, 4 Drawing Sheets

(56) References Cited

U.S. PATENT DOCUMENTS

2021/0039106 A1* 2/2021 Eldridge ................ A61P 35/00

FOREIGN PATENT DOCUMENTS

| | | |
|---|---|---|
| JP | H7-57095 A | 3/1995 |
| JP | 2002-062117 A | 2/2002 |
| KR | 10-1373064 B1 | 3/2014 |
| KR | 10-1924314 B1 | 12/2018 |
| KR | 10-2019-0051420 A | 5/2019 |
| TW | 200304909 A | 10/2003 |
| TW | 201622093 A | 6/2016 |

OTHER PUBLICATIONS

Communication dated May 8, 2021, issued by the Korean Patent Office in counterpart Korean Application No. 10-2019-0164002.

* cited by examiner

DENTAL DIGITAL MEASUREMENT APPARATUS AND DIGITAL MEASUREMENT METHOD USING THE SAME

CROSS-REFERENCE TO RELATED APPLICATION

This application claims priority to Korean Patent Application No. 10-2019-0164002, filed on Dec. 10, 2019 in the Korean Intellectual Property Office, the disclosure of which is incorporated herein by reference.

BACKGROUND OF THE DISCLOSURE

Field of the Disclosure

The present disclosure relates to a dental digital measurement apparatus and a digital measurement method using the same, and more particularly, to a dental digital measurement apparatus capable of precisely measuring a measurement object, such as a dental endodontic file, and a digital measurement method using the dental digital measurement apparatus.

Description of the Related Art

General purpose dental endodontic files are used for dental procedures such as root canal length measurement, dental pulp (nerve) removal, and root canal formation. Here, root canal formation refers to a process of completely removing nerves and infected neural walls remaining inside the neural tube of the tooth and widening the neural tube.

Meanwhile, to perform root canal treatment, root canal length measurement should be performed first. When performing root canal treatment, since the nerve length of the tooth varies per patient, an endodontic file having a length corresponding to the nerve length of the tooth of each patient should be used.

In general, an endodontic file is equipped with a stopper. When root canal length is measured using an endodontic file equipped with a stopper, the stopper is moved to a measurement point, and the length of a root canal is determined based on the position of the moved stopper. That is, the root canal length is calculated by measuring the travel distance of the stopper on the endodontic file. At this time, since a root canal should be gradually expanded in a round shape, and debris such as nerve tissues remaining inside a root apex should be removed, an endodontic file having a relatively thin thickness is used first, and then the thickness of an endodontic file used thereafter is gradually increased.

In addition, when the position of a stopper is manually adjusted by a therapist, it may be difficult to read small scales, which may lower accuracy in length measurement. In addition, the position of a stopper may be shifted by therapist's mistakes. In this case, length measurement should be performed repeatedly, which increases procedure time and reduces treatment reliability.

Therefore, to improve the accuracy and reliability of dental procedures, there is increasing demand for research to accurately measure the length of an endodontic file.

RELATED ART DOCUMENTS

Patent Documents

Korean Patent No. 10-1373064
Korean Patent Application No. 10-2017-0147059

SUMMARY OF THE DISCLOSURE

Therefore, the present disclosure has been made in view of the above problems, and it is an object of the present disclosure to provide a digital measurement apparatus capable of accurately measuring the length of a measurement object, such as an endodontic file for dental procedures. According to the present disclosure, the digital measurement apparatus may improve treatment reliability.

It is another object of the present disclosure to provide a digital measurement method by which the above object is achieved.

In accordance with one aspect of the present disclosure, provided is a digital measurement apparatus including a holding unit on which a measurement object to be measured is placed; and a measurement unit for measuring the measurement object by comparing an image of the measurement object placed on the holding unit with a preset reference value and for providing a reference for adjusting a length of a new measurement object based on a measured value of the measurement object.

In addition, the holding unit may include a flat holder on which the measurement object is placed, and reference information for setting the reference value may be displayed on the holder.

In addition, a lower portion of the holder may be provided with a backlight for illuminating the measurement object, and the holder may be selectively detachable from the holding unit and the detached holder may be sterilizable.

In addition, the measurement unit may set the reference value based on a measured value of the measurement object previously measured.

In addition, the measurement unit may include a photographing unit that is configured to face the holding unit and is responsible for photographing the measurement object; a calculator for calculating the measured value by performing calibration on the image photographed by the photographing unit based on the reference value; and a controller for providing a reference for adjusting a length of the new measurement object based on the measured value.

In addition, the controller may include a display means for displaying an image corresponding to the measured value calculated by the calculator to provide the image as a reference.

In addition, the new measurement object may be placed on the imaged displayed on the controller, and a length of the new measurement object may be measured.

In addition, the controller may display a first image obtained when the measurement object is placed on the holding unit and photographed and a second image obtained when the new measurement object different from the measurement object is placed on the holding unit and photographed in parallel, and may adjust a length of the second image with respect to the first image.

In addition, the controller may include a notification means for generating a notification sound when a length of the new measurement object is close to the measured value.

In accordance with another aspect of the present disclosure, provided is a digital measurement method including measuring a first measured value corresponding to a length of a first measurement object to be measured in comparison of a preset reference value; and adjusting a second measured value of a second measurement object different from the first measurement object based on the first measured value.

In addition, the reference value may be set to a measured value measured before the measuring.

In addition, in the measuring, when the first measurement object is placed on a holder displaying reference information for setting the reference value and photographed, a first measured value may be measured by comparing a first image of the first measurement object and the reference value.

In addition, the adjusting may include displaying the first measured value as a first image through a display means; and placing the second measurement object with respect to the first image and matching a length of the second measurement object to the first image, wherein, in the placing, repeated measurement may be allowed while continuously placing other measurement objects that have not been measured.

In addition, the adjusting may include displaying the first and second measured values in parallel as first and second images through a display means; and adjusting the second measurement object so that the second image matches the first image, wherein, in the adjusting, repeated measurement may be allowed while continuously placing new second measurement objects that have not been measured.

In addition, the digital measurement method may further include, after the adjusting of the second measurement object, notifying that the second measured value corresponds to the first measured value, wherein, in the notifying, as the second measured value gradually approaches the first measured value, frequency of occurrence of a notification sound may be gradually increased.

In addition, the first and second measurement objects may be placed on a holder, a lower portion of the holder may be provided with a backlight for illuminating the first and second measurement objects, and the holder may be detachable and sterilizable.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, preferred embodiments of the present disclosure will be described with reference to the accompanying drawings. However, the spirit of the present disclosure is not limited to the embodiments, and the spirit of the present disclosure may be proposed differently by adding, changing, and deleting the elements constituting the embodiments, which is also within the spirit of the present disclosure.

Figure 1:
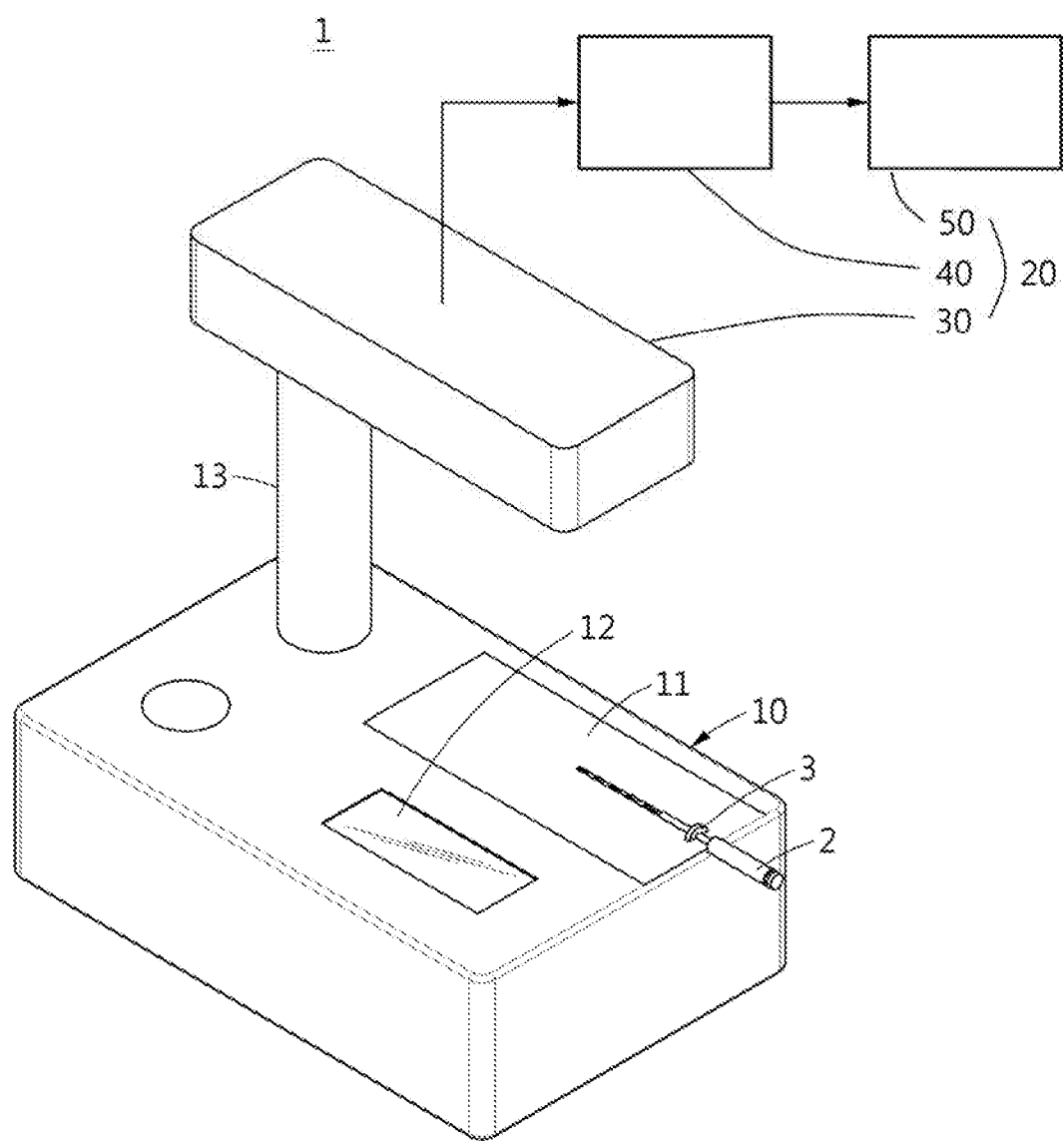
FIG. 1 is a perspective view of a digital measurement apparatus according to a preferred embodiment of the present disclosure.

Referring to FIG. 1, a digital measurement apparatus 1 according to a preferred embodiment of the present disclosure includes a holding unit 10 and a measurement unit 20.

For reference, the digital measurement apparatus 1 according to the present disclosure may be an apparatus for measuring the length of a measurement object 2 for dental procedures. In addition, the measurement object 2 may be an endodontic file used in endodontic therapy, including root canal length measurement, dental pulp (nerve) removal, and root canal formation, without being limited thereto.

In the holding unit 10, the measurement object 2 is placed. The holding unit 10 is a main body of the digital measurement apparatus 1 and includes a holder 11 having a flat plate shape on which the measurement object 2 is mounted. In addition, one side of the holding unit 10 is provided with a display window 12 for displaying predetermined information. The position of the display window 12 is not limited to the exemplary position shown in FIG. 1, and the display window 12 may display various information including the measurement information of the measurement object 2.

Figure 2:
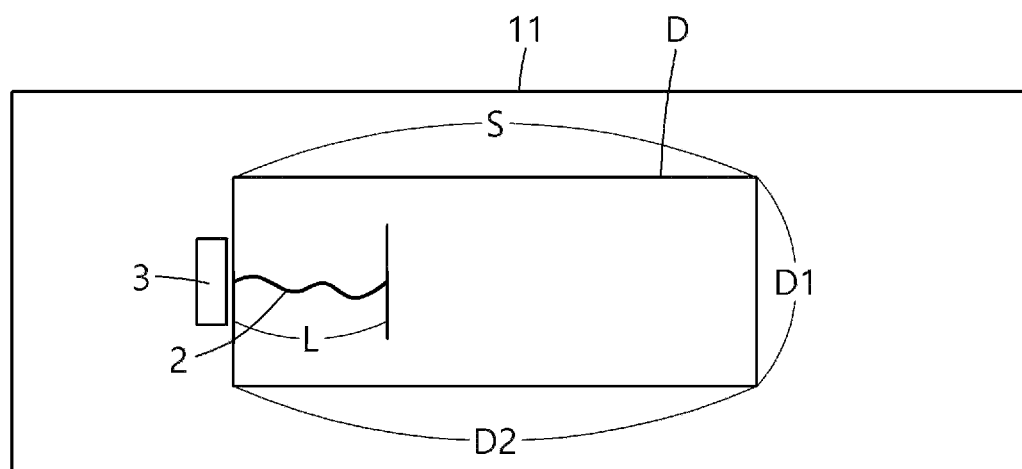
FIG. 2 schematically illustrates a state wherein reference information is displayed on the holder shown in FIG. 1.

In addition, as shown in FIG. 2, reference information D may be displayed on the holder 11. In this case, the reference information D is displayed on the holder 11 to provide a reference for measuring the length of the measurement object 2. The reference information D may be a rectangle having first and second lengths D1 and D2, without being limited thereto.

In addition, although not shown in detail, a backlight for emitting light toward the measurement object 2 placed on the holder 11 may be provided at a lower portion of the holder 11. When the measurement object 2 is illuminated by the backlight (not shown), the recognition rate of the measurement unit 20 to be described later with respect to the measurement object 2 may be improved. In addition, the holder 11 may be selectively separated from the holding unit 10, and the separated holder 11 may be sterilized. That is, when the measurement object 2 including a dental treatment tool is placed on the holder 11, sterilization may be performed to protect the measurement object 2 to be measured from bacteria.

Figure 5:
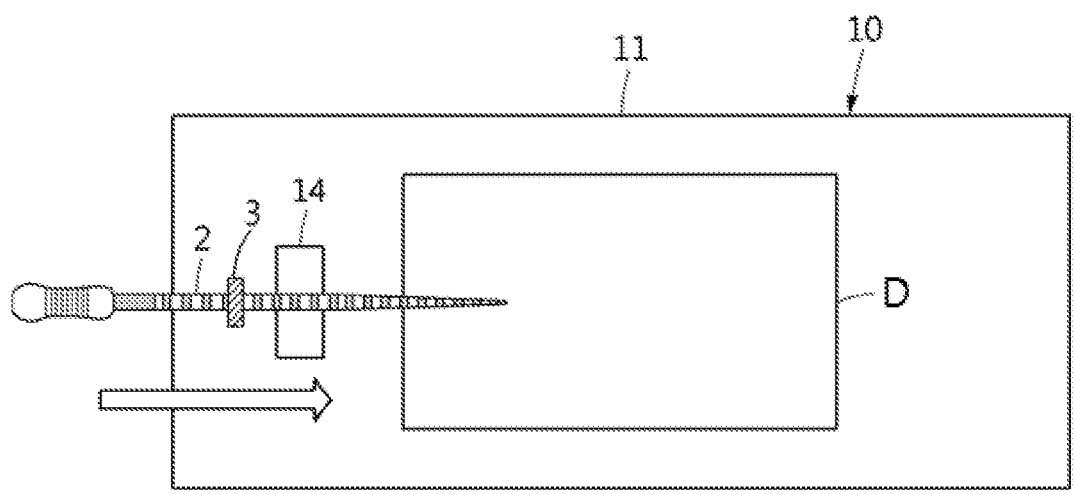
FIG. 5 is a drawing for explaining a second adjustment method in the adjustment step shown in FIG. 3.

As shown in FIG. 5, the holder 11 may be provided with an insertion groove 14 into which a stopper 3 of the measurement object 2 is inserted, and the insertion groove 14 is responsible for fixing the position of the stopper 3. With this configuration, in a state wherein the stopper 3 is inserted into the insertion groove 14 and fixed thereto, a length L of the measurement object placed in the reference information D may be adjusted.

The measurement unit 20 measures the measurement object 2 by comparing an image of the measurement object 2 placed on the holding unit 10 with a preset reference value S, and provides a reference for adjusting the length of the new measurement object 2 based on a measured value of the measurement object 2. To perform this function, the measurement unit 20 includes a photographing unit 30, a calculator 40, and a controller 50.

The photographing unit 30 is configured to face the holder 11 of the holding unit 10, and photographs the measurement object 2. The photographing unit 30 is coupled to a connection member 13 having a columnar shape extending vertically upward from the holding unit 10 so that the photographing unit 30 is formed integrally with the holding unit 10. However, the present disclosure is not limited to this configuration. The photographing unit 30 may be provided separately from the holding unit 10, and the photographing unit 30 may be moved so that the photographing unit 30 faces the holding unit 10 only when the measurement object 2 is photographed.

In this case, the photographing unit 30 may be any one of a camera and a photographing sensor. Preferably, the photographing unit 30 is set to photograph only the holder 11 of the holding unit 10, thereby preventing unnecessary photographing of other regions.

The calculator 40 calculates a measured value by calibrating an image photographed by the photographing unit 30 based on a reference value S. To perform this function, the calculator 40 sets the reference value S based on the reference information D before the measurement object 2 is measured. In addition, the calculator 40 measures a length L of the measurement object 2 through calibration performed by comparing the length of a specific section in an image of the measurement object 2 with the length or area of the reference information D. Accordingly, regardless of photographing factors such as resolution of an image photographed by the photographing unit 30 and a distance between the measurement object 2 and the photographing unit 30, the calculator 40 may improve accuracy in measuring the length of the measurement object 2.

Here, the reference value S is exemplified as the length of the reference information D of the holder 11. The calculator 40 may calculate the length from one end of the measurement object 2, which is an endodontic file, to the stopper 3 based on the reference value S.

Figure 4:
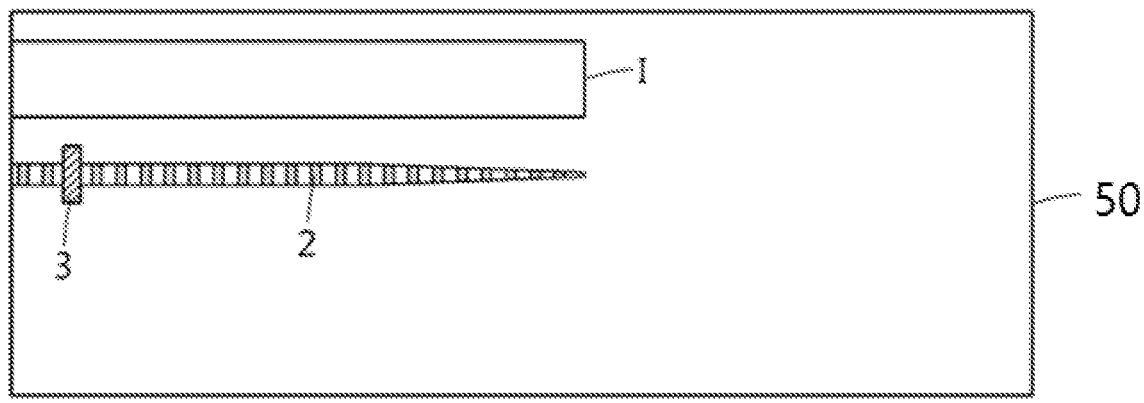
FIG. 4 is a drawing for explaining a first adjustment method in the adjustment step shown in FIG. 3.

The controller 50 provides a reference for adjusting the length of the new measurement object 2 based on a measured value of the measurement object 2 calculated by the calculator 40. As shown in FIG. 4, the controller 50 includes a display means for displaying an image I corresponding to a measured value of the measurement object 2, which has been photographed by the photographing unit 30 and has been calculated based on the preset reference information D. In this case, when the image I corresponding to the measured value is displayed on the controller 50 including the display means, a user may directly insert the new measurement object 2 in parallel with the image I, or may compare the image I with a new image of the new measurement object 2.

In addition, the controller 50 including a display means may be connected to the photographing unit 30 to display an image of the holder 11 in real time. In addition, in this embodiment, the controller 50 displays the image I having a longitudinal bar shape corresponding to the measured value of the measurement object 2, but the present disclosure is not limited thereto.

For reference, in this embodiment, the controller 50 may be provided separately from the holding unit 10, or may be provided in the holding unit 10. While an operator checks the measurement object 2 with the naked eye through the controller 50, the operator may mount the measurement object 2 on the holder 11.

Hereinafter, a digital measurement method using the digital measurement apparatus 1 shown in FIGS. 1 and 2 will be described with reference to FIG. 3.

Figure 3:
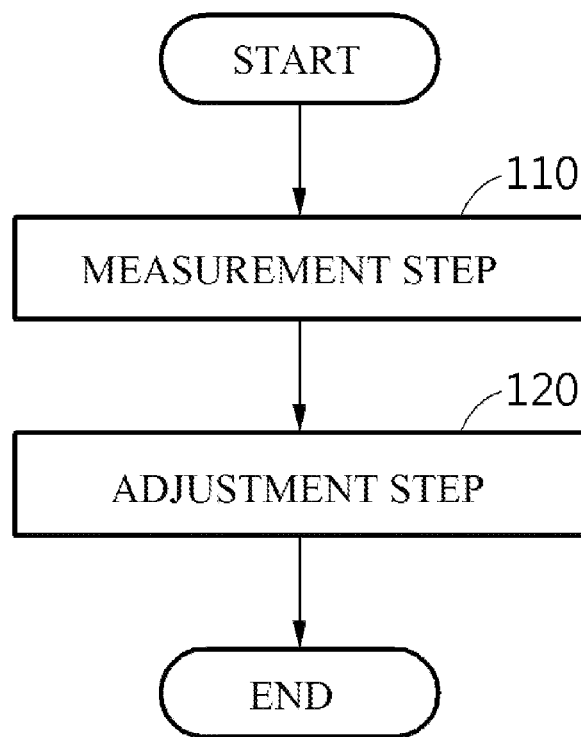
FIG. 3 is a flowchart for explaining a digital measurement method using the digital measurement apparatus shown in FIG. 1.

As shown in FIG. 3, the digital measurement method includes a measurement step 110 and an adjustment step 120.

In the measurement step 110, a measured value corresponding to the length of the measurement object 2 to be measured is measured in comparison with the preset reference value S. Thus, in the measurement step 110, the reference value S for the measurement object 2 to be measured is set. Here, the reference value S may be set to correspond to the length of the reference information D having a rectangular shape. When the reference value S is set, in the measurement step 110, the photographing unit 30 photographs the measurement object 2 placed on the holder 11, calibration is performed based on the reference value S, and the length L of the measurement object 2 is measured.

In the adjustment step 120, a reference for adjusting the length of the new measurement object 2 is provided so that the length of the new measurement object 2 matches the length of the measurement object 2. In the adjustment step 120, based on the image I corresponding to the measured value, the position of the stopper 3 of the measurement object 2 is adjusted so that the lengths of the new measurement objects 2 match.

For reference, in the adjustment step 120, by inserting the new measurement object 2 several times, repeated measurement may be performed to adjust the length of the new measurement object 2. In addition, in the adjustment step 120, the length of the measurement object 2 may be adjusted by the following two adjustment methods.

As shown in FIG. 4, according to a first adjustment method, a measured value measured in the measurement step 110 is displayed as the image I through the controller 50 including a display means. That is, the controller 50 displays the image I as a reference for adjusting the length of the new measurement object 2.

Thereafter, a user places the new measurement object 2 in the controller 50 so that the new measurement object 2 matches the image I displayed on the controller 50. At this time, a user may adjust the position of the stopper 3 so that a length L from the stopper 3 of an endodontic file as the measurement object 2 to the end of the endodontic file matches the length of the image I. Thereby, the length of the image I may match the length of the new measurement object 2. According to this adjustment method, other measurement objects 2 may be continuously placed to adjust length.

In addition, the measured length, i.e., the measured value, of the measurement object 2 may be displayed on the display window 12.

Figure 6:
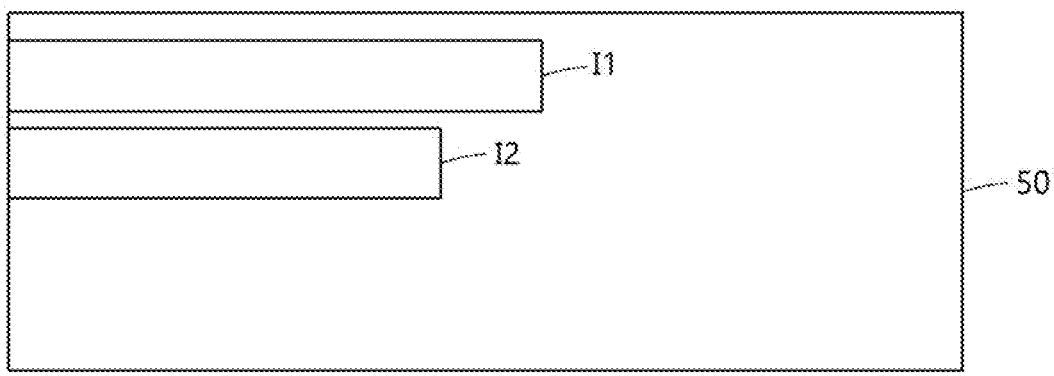
FIG. 6 schematically illustrates a state wherein first and second images are displayed on a controller by the second adjustment method of FIG. 5.

A second adjustment method will be described with reference to FIGS. 5 and 6.

As shown in FIG. 5, a measured value measured in the measurement step 110 is displayed as a first image I1 through the controller 50. In addition, when the new measurement object 2 is placed on the holder 11 in the direction of the arrow and the length of the new measurement object 2 is measured, a measured value of the new measurement object 2 is displayed as a second image I2 through the controller 50. That is, the controller 50 provides the first image I1 as a reference for adjusting the length of the new measurement object 2 and displays the second image I2 in parallel with the first image I1 to compare the lengths thereof.

Thus, a user may adjust the length of the second measurement object 2 placed on the holder 11 so that the second measurement object 2 has a length corresponding to the first image I1.

In the second measurement method, other measurement objects 2 may be placed continuously on the holder 11, and may be compared with the first image I1 displayed on a display 31. As a result, length measurement for the new measurement objects 2 may be repeatedly performed. In this case, when the length of the newly placed measurement object 2 is close to a preset dimension, a user may be notified through a notification means such as a notification sound. For example, when the length of the captured image of the new measurement object 2 matches a first captured image as the first image I1, a notification sound may be quickly generated.

As described above, to measure the length of the measurement object 2, the calculator 40 sets the reference value S, and calibration is performed to compare the captured image I of the measurement object 2 with the set reference value S. Accordingly, regardless of photographing conditions such as the resolution of the image of the measurement object 2 and a distance between the measurement object 2 and the measurement unit 20, a precise measurement value may be obtained.

In addition, the new measurement objects 2 may be repeatedly placed until the length of the new measurement object 2 corresponds to a previously measured value, thereby improving treatment reliability.

According to the present disclosure having the above-described configuration, by comparing the length of a specific section in an image of a measurement object with a set reference value, the length of the measurement object is calculated. Thus, regardless of photographing conditions such as image resolution and a distance for photographing, precise length measurement can be performed.

In addition, the length of a measurement object, such as an endodontic file, which is a dental treatment apparatus having a simple structure, can be measured accurately. Thus, accessibility of a use and treatment reliability can be improved.

As described above, the present disclosure has been described in detail with reference to the preferred examples. However, these examples are provided for illustrative purposes only and should not be construed as limiting the scope and spirit of the present disclosure. In addition, it will be apparent to those skilled in the art that various changes and modifications may be made without departing from the spirit and scope of the present disclosure.

DESCRIPTION OF SYMBOLS

1: DIGITAL MEASUREMENT APPARATUS
2: MEASUREMENT OBJECT
3: STOPPER
10: HOLDING UNIT
11: HOLDER
20: MEASUREMENT UNIT
30: PHOTOGRAPHING UNIT
40: CALCULATOR
50: CONTROLLER
S: REFERENCE VALUE

What is claimed is:

1. A dental digital measurement apparatus, comprising:
   a holding unit on which a measurement object to be measured is placed; and
   a measurement unit for measuring the measurement object by comparing an image of the measurement object placed on the holding unit with a preset reference value and for providing a reference for adjusting a length of a new measurement object based on a measured value of the measurement object,
   wherein the measurement unit comprises:
   a photographing unit configured to face the holding unit and to photograph the measurement object;
   a calculator for calculating the measured value by performing calibration on the image of the measurement object photographed by the photographing unit based on the preset reference value; and
   a controller for providing a reference for adjusting a length of the new measurement object based on the measured value,
   wherein reference information corresponding to the preset reference value is displayed on the holding unit,
   wherein the photographing unit photographs the measurement object and the reference information together, and
   wherein the calculator measures a length of the measurement object through calibration performed by comparing a length of a specific section in the photographed image of the measurement object with a length or area of the reference information.

2. The dental digital measurement apparatus according to claim 1, wherein the holding unit comprises a flat holder on which the measurement object is placed, and the reference information is displayed on the holder.

3. The dental digital measurement apparatus according to claim 2, wherein a lower portion of the holder is provided with a backlight for illuminating the measurement object, and the holder is selectively detachable from the holding unit and the detached holder is sterilizable.

4. The dental digital measurement apparatus according to claim 1, wherein the controller comprises a display means for displaying an image corresponding to the measured value calculated by the calculator to provide the image as a reference.

5. The dental digital measurement apparatus according to claim 4, wherein the new measurement object is placed on the image displayed by the controller, and a length of the new measurement object is measured.

6. The dental digital measurement apparatus according to claim 4, wherein the controller displays a first image obtained when the measurement object is placed on the holding unit and photographed and a second image obtained when the new measurement object different from the measurement object is placed on the holding unit and photographed in parallel, and adjusts a length of the second image with respect to the first image.

7. The dental digital measurement apparatus according to claim 1, wherein the controller comprises a notification means for generating a notification sound based on a length of the new measurement object and the measured value.

8. A dental digital measurement method, comprising:
   measuring a first measured value corresponding to a length of a first measurement object to be measured in comparison of a preset reference value; and
   adjusting a second measured value of a second measurement object different from the first measurement object based on the first measured value,
   wherein the preset reference value is set to a measured value measured before the measuring, and
   wherein in the measuring, when the first measurement object is placed on a holder displaying reference information corresponding to the reference value and is photographed together with the reference information, the first measured value is measured through calibration performed by comparing a length of a specific section of a photographed first image of the first measurement object with a length or area of the reference information.

9. The dental digital measurement method according to claim 8, wherein the adjusting comprises displaying the first measured value as a first image through a display means; and
   placing the second measurement object with respect to the first image and matching a length of the second measurement object to the first image, wherein, in the placing, repeated measurement is allowed while continuously placing other measurement objects that have not been measured.

10. The dental digital measurement method according to claim 8, wherein the adjusting comprises displaying the first and second measured values in parallel as first and second images through a display means; and adjusting the second measurement object so that the second image matches the first image, wherein, in the adjusting, repeated measurement is allowed while continuously placing new second measurement objects that have not been measured.

11. The dental digital measurement method according to claim 10, further comprising, after the adjusting of the second measurement object, notifying that the second measured value corresponds to the first measured value, wherein, in the notifying, as the second measured value gradually approaches the first measured value, frequency of occurrence of a notification sound is gradually increased.

12. The dental digital measurement method according to claim 8, wherein the first and second measurement objects are placed on a holder, a lower portion of the holder is provided with a backlight for illuminating the first and second measurement objects, and the holder is detachable and sterilizable.

\* \* \* \* \*